US007673701B2

(12) United States Patent
Tanaka et al.

(10) Patent No.: US 7,673,701 B2
(45) Date of Patent: Mar. 9, 2010

(54) POWER TOOL HAVING CONTROL MEANS FOR MONITORING SCREW TIGHTENING OPERATIONS

(75) Inventors: Naotake Tanaka, Hikone (JP); Hiroshi Miyazaki, Hikone (JP); Makoto Katou, Ichinomiya (JP)

(73) Assignee: Matsushita Electric Works, Ltd., Kadoma-shi, Osaka (JP)

( * ) Notice: Subject to any disclaimer, the term of this patent is extended or adjusted under 35 U.S.C. 154(b) by 60 days.

(21) Appl. No.: 11/892,976

(22) Filed: Aug. 29, 2007

(65) Prior Publication Data

US 2008/0257577 A1 Oct. 23, 2008

(30) Foreign Application Priority Data

Aug. 31, 2006 (JP) ............................ 2006-236540

(51) Int. Cl.
*B23B 45/00* (2006.01)
*B23B 45/02* (2006.01)

(52) U.S. Cl. ........................................................ 173/4

(58) Field of Classification Search ..................... 173/4, 173/11, 18, 20, 217, 176; 81/57.11
See application file for complete search history.

(56) References Cited

U.S. PATENT DOCUMENTS

| | | | | |
|---|---|---|---|---|
| 4,813,312 | A * | 3/1989 | Wilhelm | 81/467 |
| 5,014,793 | A * | 5/1991 | Germanton et al. | 173/181 |
| 5,277,261 | A * | 1/1994 | Sakoh | 173/176 |
| 5,903,462 | A * | 5/1999 | Wagner et al. | 700/168 |
| H1821 | H * | 12/1999 | Kosinski | 173/180 |
| 6,457,535 | B1 * | 10/2002 | Tanaka | 173/48 |
| 6,536,536 | B1 * | 3/2003 | Gass et al. | 173/2 |
| 6,607,041 | B2 * | 8/2003 | Suzuki et al. | 173/4 |
| 2002/0050364 | A1 | 5/2002 | Suzuki et al. | |
| 2002/0134172 | A1 * | 9/2002 | Yamada et al. | 73/862.21 |
| 2005/0045354 | A1 | 3/2005 | Arimura et al. | |
| 2005/0121209 | A1 | 6/2005 | Shimizu et al. | |
| 2008/0173139 | A1 * | 7/2008 | Miyazaki et al. | 81/57.11 |

FOREIGN PATENT DOCUMENTS

| | | |
|---|---|---|
| CN | 100337793 C | 2/2005 |
| JP | 59-55670 | 4/1984 |
| JP | 62-124881 | 6/1987 |
| JP | 62-159286 | 10/1987 |
| JP | 63-83277 | 6/1988 |

(Continued)

*Primary Examiner*—Brian D Nash
(74) *Attorney, Agent, or Firm*—Bacon & Thomas, PLLC

(57) ABSTRACT

A power tool includes a driving unit for performing screw tightening operations; a motor for rotatably driving the driving unit; a rechargeable battery pack; a trigger switch for turning on and off the motor; and a control circuit, accommodated in a main body of the power tool, for monitoring the screw tightening operations. The control circuit has a screw tightening completion detection unit for detecting completion of a screw tightening operation, a screw tightening count unit for counting the number of detected tightening operations, a screw tightening number setting unit for presetting the number of screws to be tightened, a screw tightening completion notifying unit for notifying completion of the screw tightening operations when the number of detected tightening operations reaches the preset number. Further, the screw tightening number setting unit and the screw tightening completion notifying unit is disposed at a lower front portion of a grip portion.

7 Claims, 12 Drawing Sheets

FOREIGN PATENT DOCUMENTS

| | | |
|---|---|---|
| JP | 63-186579 | 11/1988 |
| JP | 11-196397 | 7/1999 |
| JP | 2000-108047 | 4/2000 |
| JP | 2000-250434 | 9/2000 |
| JP | 2001269874 | 10/2001 |
| JP | 2005-040933 | 2/2005 |
| JP | 2005-066785 | 3/2005 |
| JP | 2005-144564 | 6/2005 |

* cited by examiner

POWER TOOL HAVING CONTROL MEANS FOR MONITORING SCREW TIGHTENING OPERATIONS

FIELD OF THE INVENTION

The present invention relates to a rechargeable power tool having a function of monitoring a screw tightening operation.

BACKGROUND OF THE INVENTION

When a product is assembled by a power tool or the like by repeatedly performing a screw tightening operation, and if checking the completion of a series of screw tightening operations solely relies on an operator, some of the screws may sometimes remain unfastened. Since occurrence of such case would lead to deterioration in quality and reliability of the product, the number of tightening operations needs to be checked in every operation process. Accordingly, excessive burdens are imposed on the operator though mistakes cannot be completely prevented.

To that end, there have been a number of proposals for inventions that are geared towards preventing forgetfulness of a screw tightening operation by using a controller that is connected to a power tool which counts the number of tightening operations (see, e.g., Japanese Patent Laid-open Applications Nos. H9-150338, 2003-123050 and 2005-125464).

Although the above prior art references can improve the drawbacks of forgetting the screw tightening operation, its applications are limited due to the fact that the power tool and the controller are connected with each other by a power cord. This problem may not be that serious when an operator is working in a restricted working area using a corded power tool or a pneumatic power tool connected to an air hose. However, when an operator is working in an unrestricted area, handling of tool and the controller would become troublesome, or restriction on the area where an operator can work may arise. Especially, in case of a cordless rechargeable power tool, the inherent advantages of the cordlessness diminish.

Therefore, the present inventors have proposed an idea of accommodating a control circuit in a main body of the power tool, for monitoring the screw tightening operations. Then, the control circuit is a precision electronic device so that the control circuit needs to be protected from impacts and vibrations. Accordingly, when a control circuit board is installed inside the power tool, a location of the board needs to be carefully chosen. Especially, when the power tool falls and collides against the ground, great impacts and vibrations may be given to the control circuit to be damaged. Therefore, it is critical to protect it from damage.

SUMMARY OF THE INVENTION

In view of the drawbacks of the prior art, the present invention provides a power tool capable of performing management of the number of tightening operations without using a power cord that is unnecessary for a rechargeable power tool. As a result, the inherent advantages of the cordlessness can be fully utilized and a work area can not be restricted, so that work efficiency can be enhanced. Further, the power tool can be a small size for convenient use and can have good durability for being used under severe conditions.

In accordance with the present invention, there is provided a power tool including: a driving unit for performing screw tightening operations; a motor for rotatably driving the driving unit; a rechargeable battery pack; a trigger switch for turning on and off the motor; and a control circuit, accommodated in a main body of the power tool, for monitoring the screw tightening operations. The control circuit has a screw tightening completion detection unit for detecting completion of a screw tightening operation; a screw tightening count unit for counting the number of detected tightening operations; a screw tightening number setting unit for presetting the number of screws to be tightened; and a screw tightening completion notifying unit for notifying completion of the screw tightening operations when the number of detected tightening operations reaches the preset number of screws. Further, the screw tightening number setting unit and the screw tightening completion notifying unit are disposed at a lower front portion of a grip portion, in the main body of the power tool, for being held by a hand.

With this configuration, the power tool can performs management of the number of tightening operations without a power cord that is unnecessary for a rechargeable power tool by using the control circuit accommodated in the main body of the power tool, for monitoring a screw tightening operation. Further, the lower front portion of the grip portion is provided with a screw tightening number setting unit and a screw tightening completion notifying unit so that the grip portion of the housing need not to be enlarged and, also, gripping of the grip portion is not hindered. Further, the grip portion is not subject to great impacts or vibrations, compared to the heavy body portion having therein the motor, when the power tool is dropped during its use. Therefore, it is possible to effectively prevent damages from being inflicted on the components of the screw tightening number setting unit and the screw tightening completion notifying unit.

It is preferable that a protruded elastomer is installed around an outer periphery of the lower front portion of the grip portion. The elastomer is designed to absorb the impacts when the power tool main body is dropped during its use. Accordingly, the grip portion is protected from large impacts or vibrations and, it is also possible to prevent the breakage of the screw tightening number setting unit and its components (the setting/display unit, the piezoelectric buzzer and the control circuit). Further, the durability of the power tool can be further enhanced with the addition of the elastomer so that the power tool can be used under severe conditions.

Further, the screw tightening number setting unit may be provided with a hold function to prevent the preset number of screws to be fastened from being changed. In this case, when the hold function is activated, the preset number of screws may not be changed accidentally. For instance, even if the screw tightening number setting unit is manipulated unintentionally during the operation, the preset number of screws is unchanged. Consequently, the preset number of screws can be precisely managed while maintaining the setting state during the operation.

It is preferable that a body portion and the grip portion of the main body of the power tool are connected rotatably such that an angle therebetween is changed freely and the display of the number of tightening operations set by the screw tightening number setting unit provided at the lower front portion of the grip portion is displayed upside down. In this case, when an operator use the power tool by holding the grip portion heading either upward or downward, it is easy for the operator to read data on the setting/display unit and perform a smooth screw tightening operations.

In the present invention, the power tool can performs management of the number of tightening operations without a power cord that is unnecessary for a rechargeable power tool, by using the control circuit accommodated in the main body of the power tool, for monitoring a screw tightening operation. Further, a work area can not be restricted, so that work efficiency can be enhanced. The lower front portion of the grip portion is provided with a screw tightening number setting unit and a screw tightening completion notifying unit so that the gripping of the grip portion is not hindered and the power tool can be also conveniently used in a small space due to its small size. Further, the grip portion is not subject to great impacts or vibrations, compared to the heavy body portion having therein the motor, when the power tool is dropped during its use. Therefore, it is possible to effectively prevent damages from being inflicted on the components of the screw tightening number setting unit and the screw tightening completion notifying unit so that the durability of the power tool can be further enhanced and the power tool can be used under severe conditions.

BRIEF DESCRIPTION OF THE DRAWINGS

The above and other objects and features of the present invention will become apparent from the following description of embodiments, given in conjunction with the accompanying drawings, in which.

DETAILED DESCRIPTION OF THE EMBODIMENT

Figure 1:
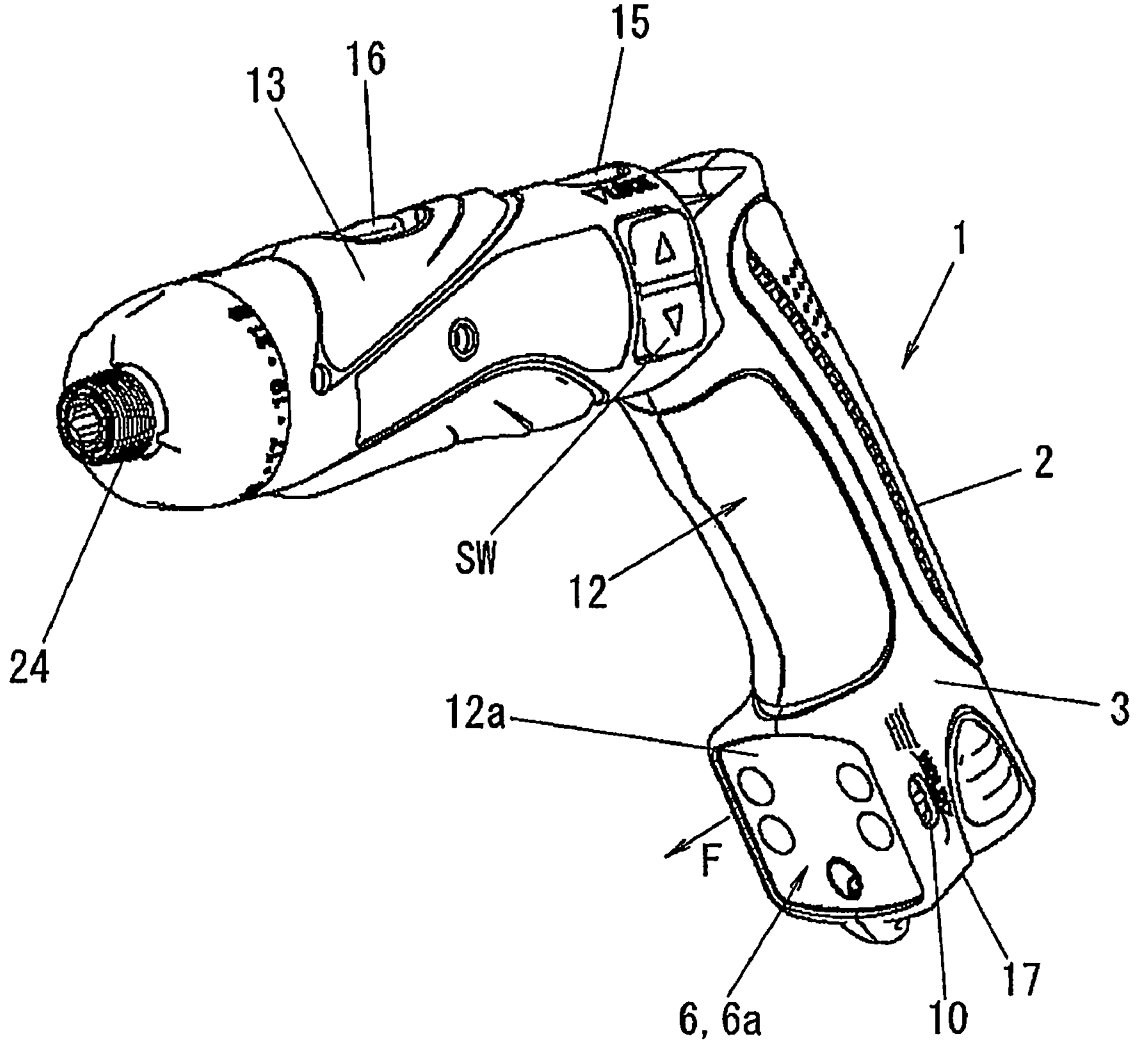
FIG. 1 is a perspective view of a power tool in accordance with an embodiment of the present invention, the power tool being used in an L shape position.
Figure 2:
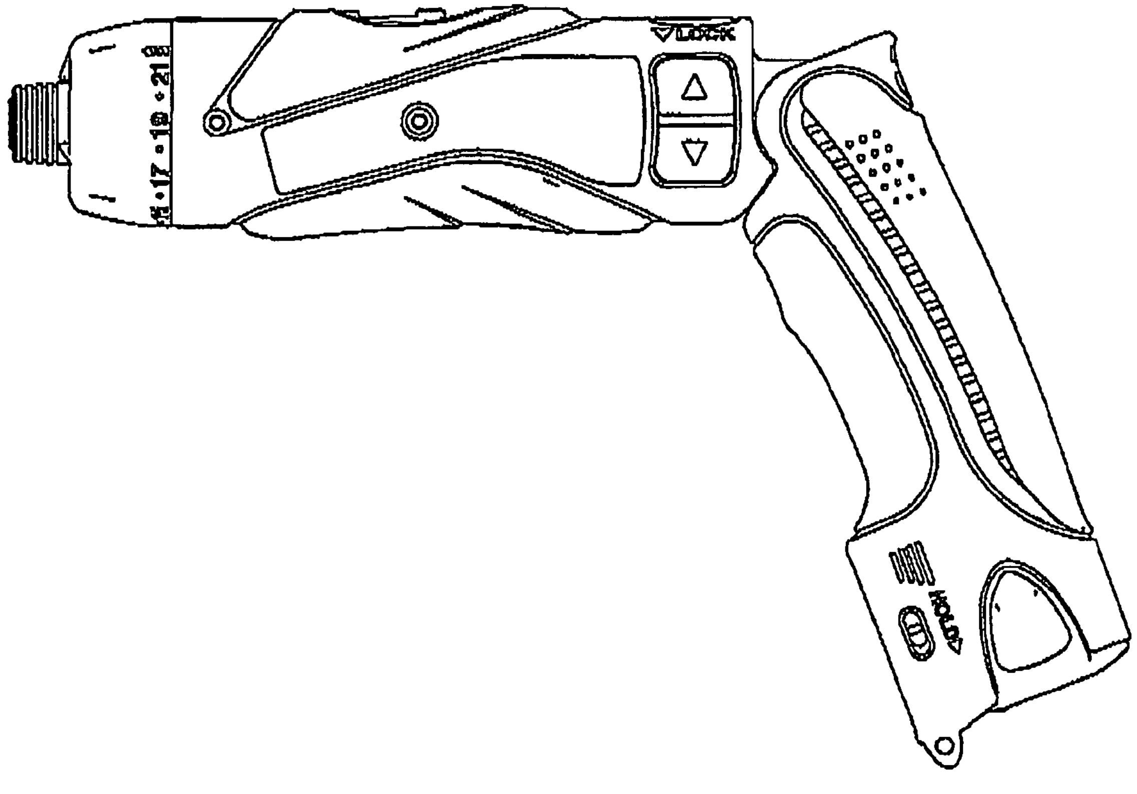
FIG. 2 shows a side view of the power tool in FIG. 1.
Figure 3:
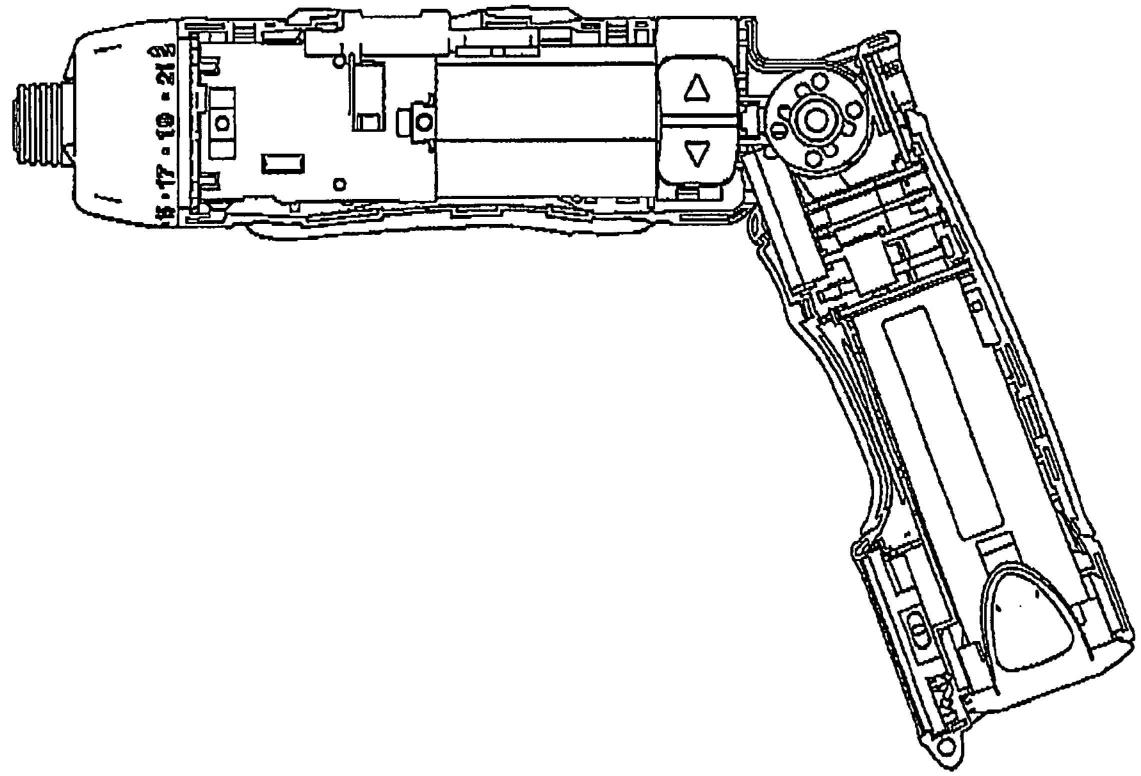
FIG. 3 depicts a side cross sectional view of the power tool in FIG. 1.
Figure 4:
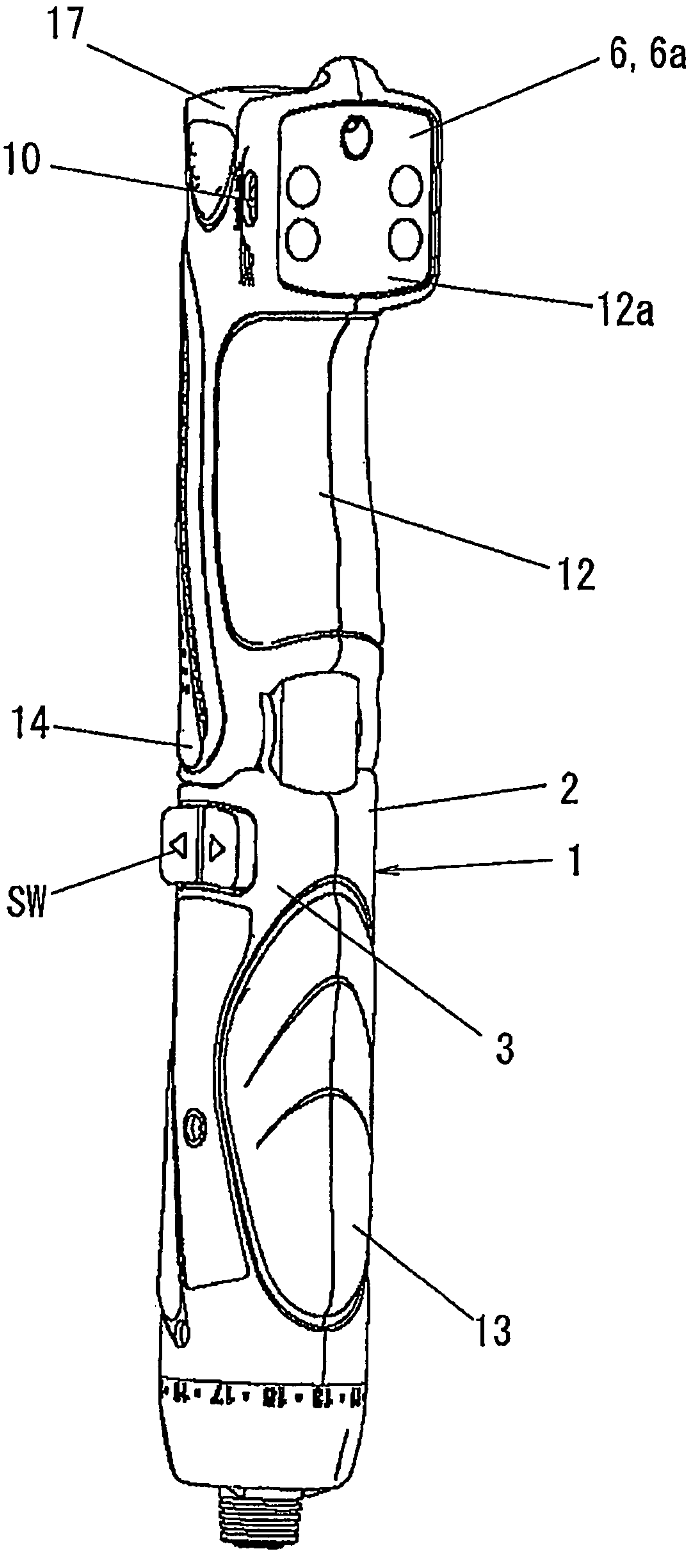
FIG. 4 provides a side view of the power tool being used in a straight shape.

Hereinafter, embodiments of the present invention will be described in detail with reference to the accompanying drawings that form a part hereof.

In this embodiment, an electric screwdriver will be described as an example of a power tool 1. However, the power tool 1 can be a cordless hammer drill, a cordless drill/driver, or any other device obvious to one skilled in the art, without departing from the scope of the present invention.

The power tool 1 includes a driving unit 24 for performing screw tightening operations; a motor 11 for rotatably driving the driving unit 24; a trigger switch SW for turning on and off the motor 11; an attachable/detachable rechargeable battery pack 9; and a housing 3 for accommodating therein the above components.

The driving unit 24 is provided with a clutch mechanism. As the screw tightening operation proceeds, a torque applied to a driver bit pressed against a screw to be tightened increases and reaches a specific level. At that moment, the clutch is driven to disengage a mechanical connection between the motor 11 and the corresponding driver bit. When a clutch is driven, a screw tightening completion detection unit 4 detects that and transmits a shut-off signal (pulse signal) to a screw tightening count unit 5.

The housing 3 of a power tool main body 2 can have a straight shape (T-shape) or an L-shape configuration for the balance of the main body 2. Here, as shown in FIGS. 1 to 5, a grip portion 12 and a body portion 13 are connected rotatably about a rotational shaft portion 14 such that an angle therebetween can be changed freely. The rotational shaft 14 allows the housing 3 of the main body 2 to be varied between the straight shape and the L-shape. Further, a structure for changing the angle about the rotational shaft portion 14 and maintaining changed angle can be configured properly without being limited to a specific one. By changing the angle of the grip portion 12 as set forth above, the shape of the housing 3 can be varied to provide an easy grip for an operator. In general, the L-shaped housing 3 is suitable for a horizontal or an upward screw tightening operation, whereas the straight-shaped housing 3 is suitable for a downward screw tightening operation.

The body portion 13 of the housing 3 has the driving unit 24, the motor 11, the trigger switch SW, a lock switch 15 for maintaining the off state of the trigger switch SW, and a control switch 16 for adjusting an output torque and a rotation speed of the motor 11. Installed at the clutch side of the motor 11 is a photo-interrupter **4*a* constituting the screw tightening completion detection unit 4. Upon the completion of a single screw tightening operation, the movement of the clutch is detected, and the detection signal is transmitted to the screw tightening count unit 5. The screw tightening completion detection unit 4 is not limited to employing the photo-interrupter 4*a*** for detecting the completion of the screw tightening but may also employ a distance sensor or use a motor off signal.

Figure 5:
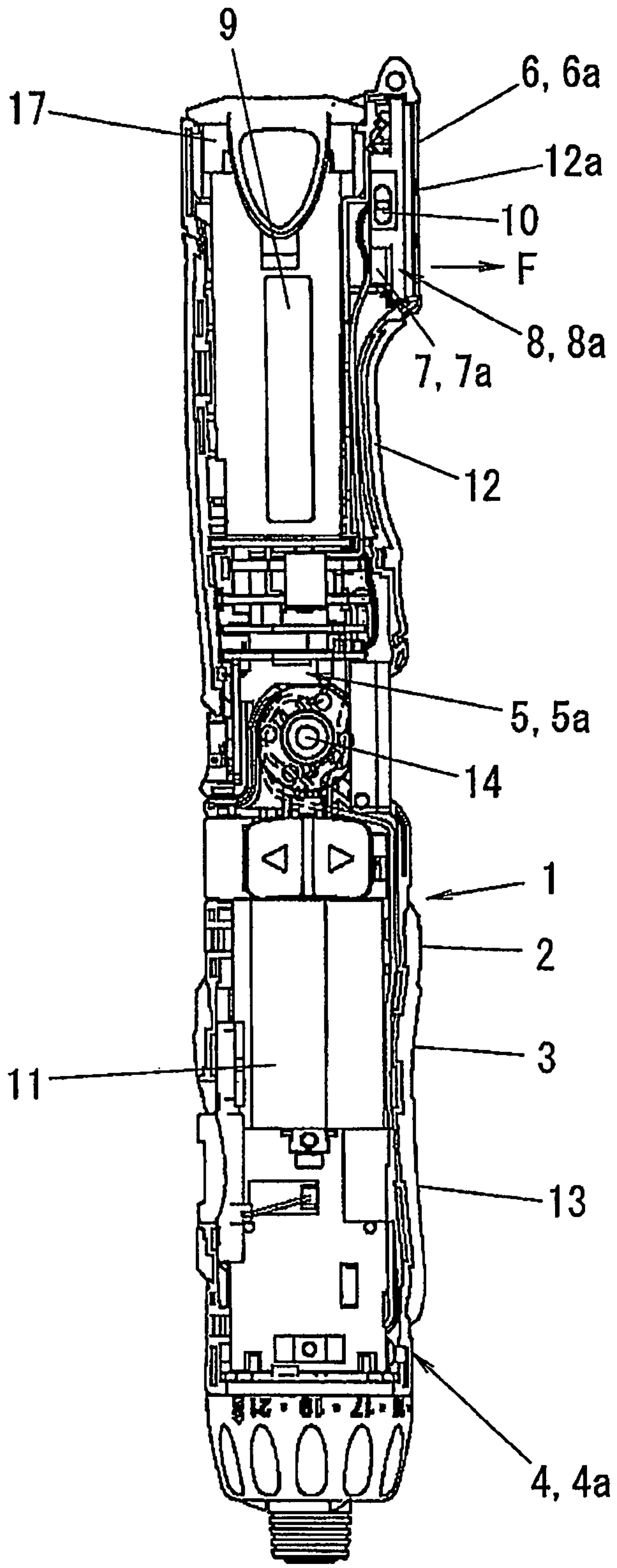
FIG. 5 presents a side cross sectional view of the power tool in FIG. 4.

The grip portion 12 of the housing 3 is provided with a battery pack mounting portion 17 for detachably mounting the battery pack 9. Further, a control circuit board **8*a* for monitoring the screw tightening operations is installed in the grip portion 12. Moreover, as illustrated in FIG. 5, a microcomputer 5*a* constituting the screw tightening count unit 5 is installed inside the grip portion 12 near the rotational shaft portion 14. The microcomputer 5*a* may also be installed inside a lower front portion 12*a* of the grip portion 12**.

As can be seen from FIG. 5, the lower front portion **12*a* of the grip portion 12 is provided with a setting/display unit 6*a* constituting a screw tightening number setting unit 6; and a piezoelectric buzzer 7*a* constituting a screw tightening completion notifying unit 7. In this embodiment, the lower front portion 12*a* of the grip portion 12 is protruded more forward in a front direction F compared to a hand-grip portion of the grip portion 12, so that the lower front portion 12*a* is not touched by a hand when the grip portion 12 is held by the hand. Accordingly, an operator can easily hold the grip portion 12 without touching the setting/display unit 6*a* that is exposed at the lower front portion 12*a***.

Here, the lower front portion **12*a* of the grip portion 12 indicates a portion positioned below the hand-grip portion of the grip portion 12, while facing forward along the front direction F when the grip portion 12 is held by a hand. Further, the front direction F is the same as that along which an output side (driven bit) of the body portion 13 directs when the body portion 13 and the grip portion 12** form the L-shape by bending.

Figure 7:
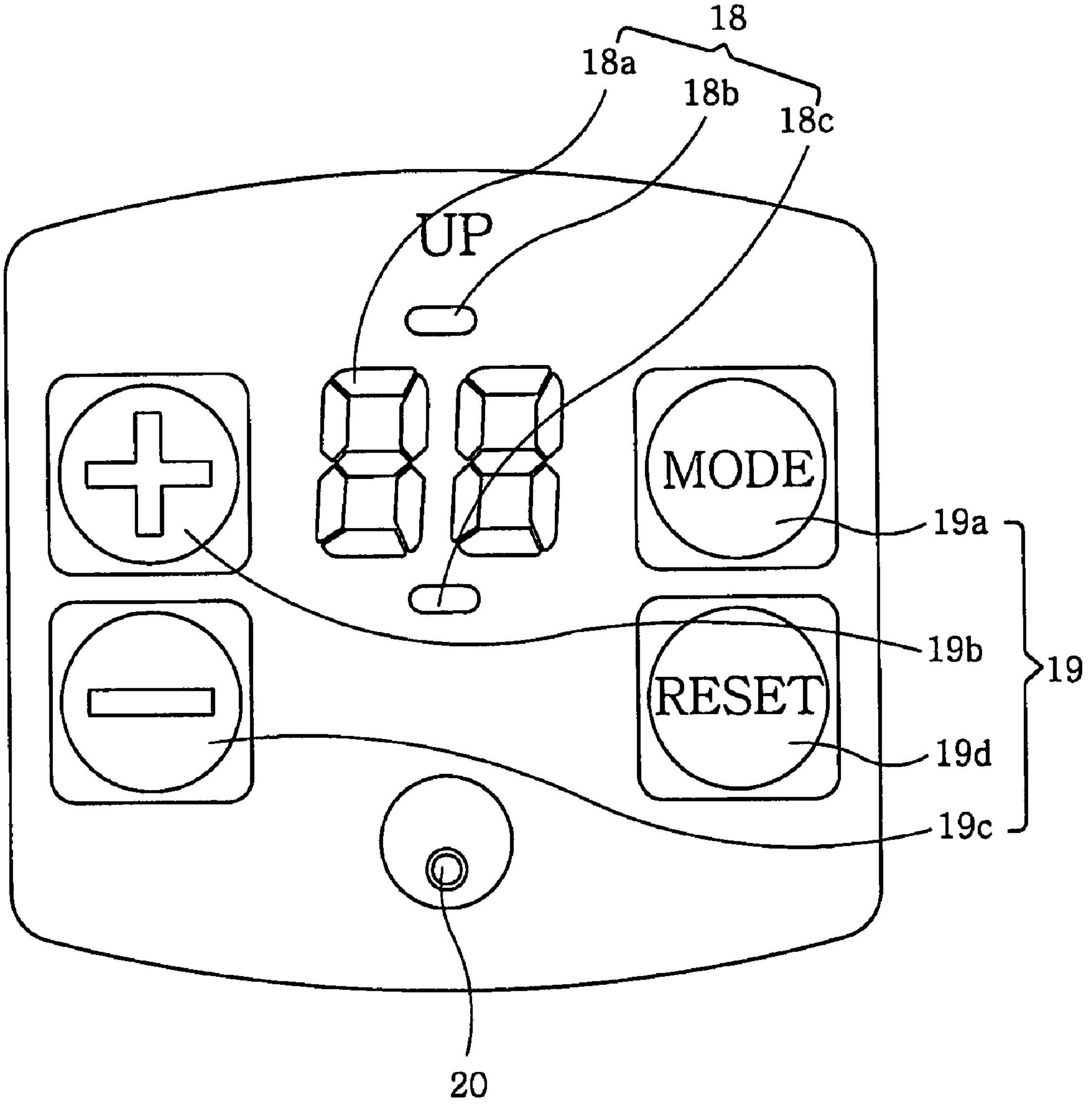
FIG. 7 is a front view of a setting/display unit.

As depicted in FIG. 7, the setting/display unit 6*a*, exposed at the lower front portion 12*a* of the grip portion 12, includes a display part 18 and setting buttons 19. The display portion 18 has an LED part 18*a* for displaying numerical values and an upper and a lower lamp 18*b* and 18*c* for indicating selected count-up and count-down mode, respectively. The setting buttons 19 have a "mode" button 19*a*, a "reset" button 19*d*, a "+" button 19*b* and a "−" button 19*c*. In addition, a reference numeral 20 in FIG. 7 represents an LED light for supporting an operation in the dark environment.

Figure 8:
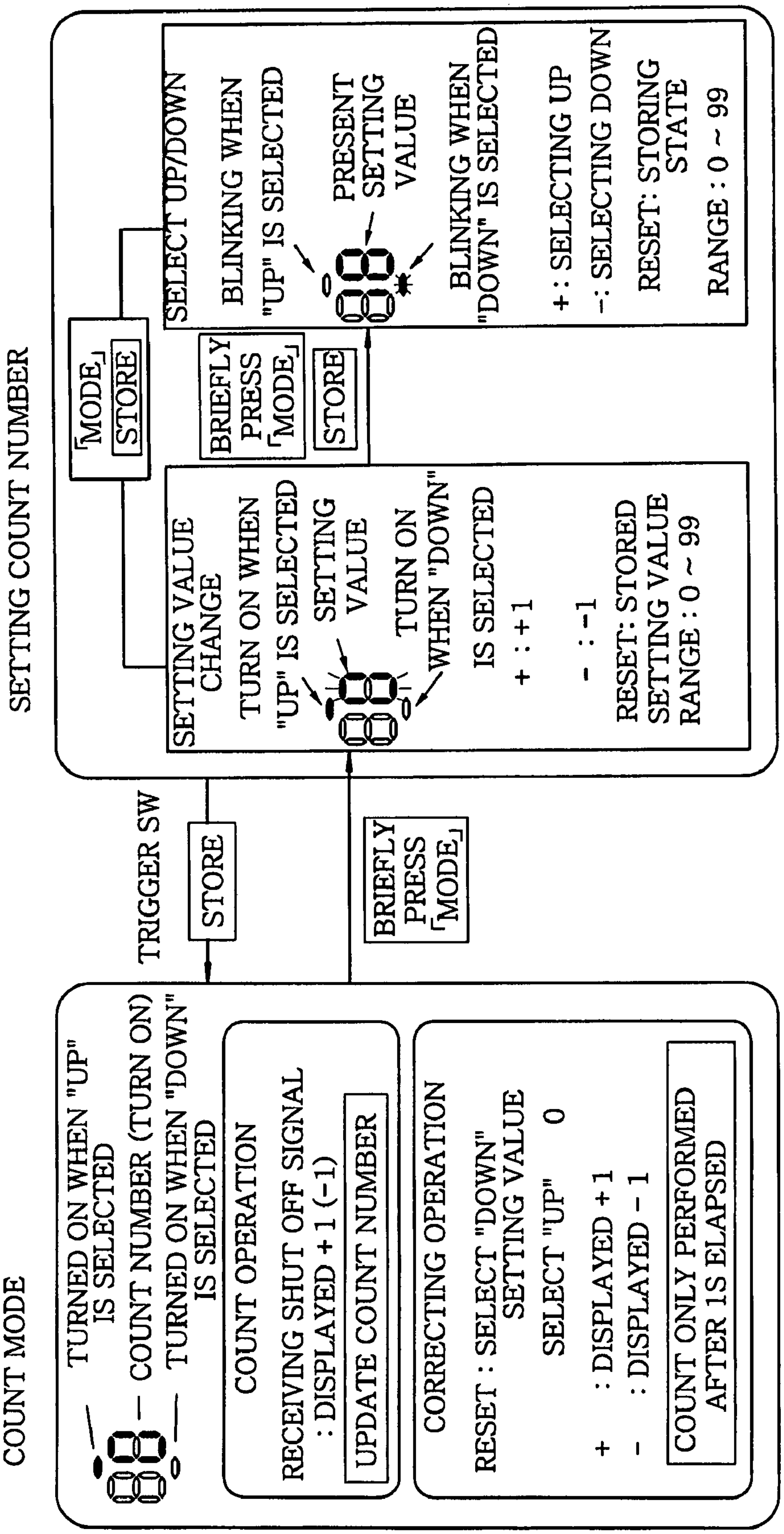
FIG. 8 offers diagrams explaining a count mode and a count setting in the setting/display unit.

Hereinafter, an exemplary method of using the setting/display unit 6*a* will be described with reference to FIGS. 8 and 9. When the trigger switch SW of the power tool main body 2 is turned on, the LED part 18*a* of the display portion 18 is turned on as shown in FIG. 8, so that it is possible to set or change a required number of tightening operations. To begin with, if the "mode" button 19*a* is briefly pressed, a count-up/down selection mode is executed in which one of the upper lamp 18*b* and the lower lamp 18*c* blinks. If the upper lamp 18*b* blinks by pressing the "+" button 19*b*, the count-up mode is selected. On the other hand, if the lower lamp 18*c* blinks by pressing the "−" button 19*c*, the count-down mode is selected. Next, if the "mode" button 19*a* is briefly pressed again, the selected mode is stored, and a setting value change mode is executed in which the LED part 18*a* blinks. In that state, the number of tightening operations can be set by pressing the "+" button 19*b* or the "−" button 19*c*. In this example, the number of tightening operations can be set up to 99. Thereafter, when the "mode" button 19*a* is briefly pressed again, the setting value is stored. An order of executing the count up/down selection mode and the setting value change mode can be changed.

Figure 9:
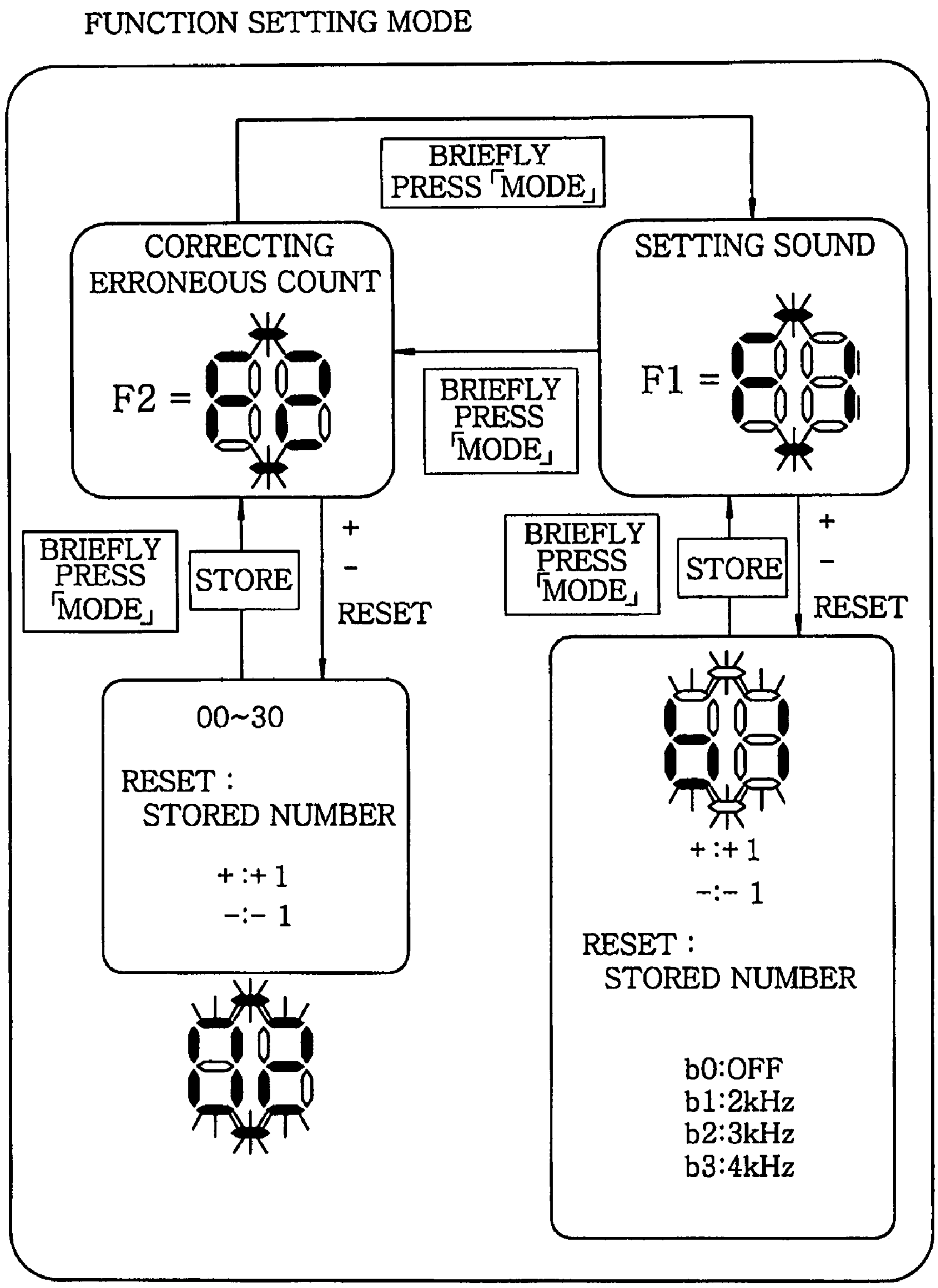
FIG. 9 sets forth a diagram for explaining a function setting mode of the setting/display unit.

Meanwhile, if the "mode" button 19*a* is pressed longer (e.g., more than 2 seconds), a sound setting mode illustrated in FIG. 9 is initiated and in this example, "F1" is displayed on the LED part 18*a*. In this state, moreover, whenever the "+" button 19*b* or the "−" button 19*c* is pressed once, one of alarm sounds having different pitches (in this example, alarm sounds having three different frequencies) is produced one after another. If the "mode" button 19*a* is pressed while one of the alarm sounds having a specific pitch is produced, the alarm sound having that pitch is selected and stored. As a result, it is possible to prevent multiple operators working in a same area from being confused by the alarm sounds of adjacent operators. Next, if the "mode" button 19*a* is briefly pressed, the character displayed on the LED part 18*a* is switched from "F1" to "F2", and an erroneous count correcting mode is executed. If an erroneous count occurs due to stoppage of the motor 11 during the operation for example, the erroneous count can be corrected by pressing the "+" button 19*b*, the "−" button 19*c* and the "reset" button 19*d* during the state where the LED 18A displays "F2".

Moreover, in this embodiment, a double tightening count prevention function is provided. The double tightening count prevention function is executed when a double tightening operation (tightening check-out operation) that tightens a same screw twice is carried out within a predetermined time period. For example, if the count time is set to one second, only a tightening operation performed not within one second after the completion of the previous one is counted, whereas a second tightening operation performed within one second is not counted.

Figure 10:
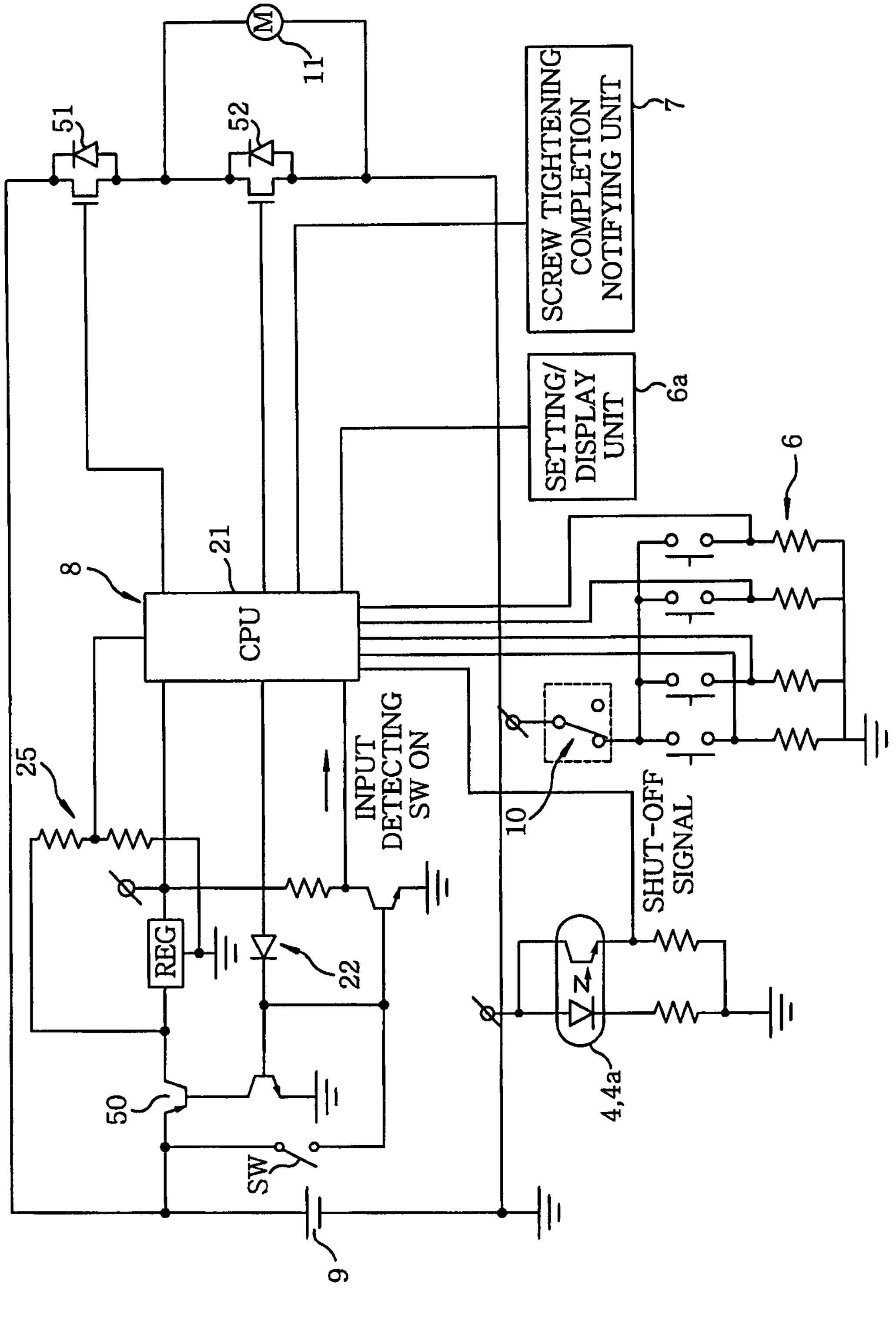
FIG. 10 sets forth a circuit diagram of a control circuit for monitoring screw tightening operations.

FIG. 10 shows a circuit diagram of a control circuit 8, formed on the control circuit board 8*a*, for monitoring screw tightening operations. When the trigger switch SW is turned on, a CPU 21 is supplied with a power supply voltage. The CPU 21 has a power self-maintenance unit 22 for self-holding the power supplied thereto and a battery voltage measuring unit 25 for detecting the voltage of the supplied power. The CPU 21 receives a shut-off signal from the photo-interrupter 4*a* serving as the screw tightening completion detection unit 4 and a input setting signal from the setting/display unit 6*a*. Reference numerals 50, 51 and 52 in FIG. 10 indicate a circuit voltage driving device, a motor driving FET and a break FET, respectively.

Figure 11:
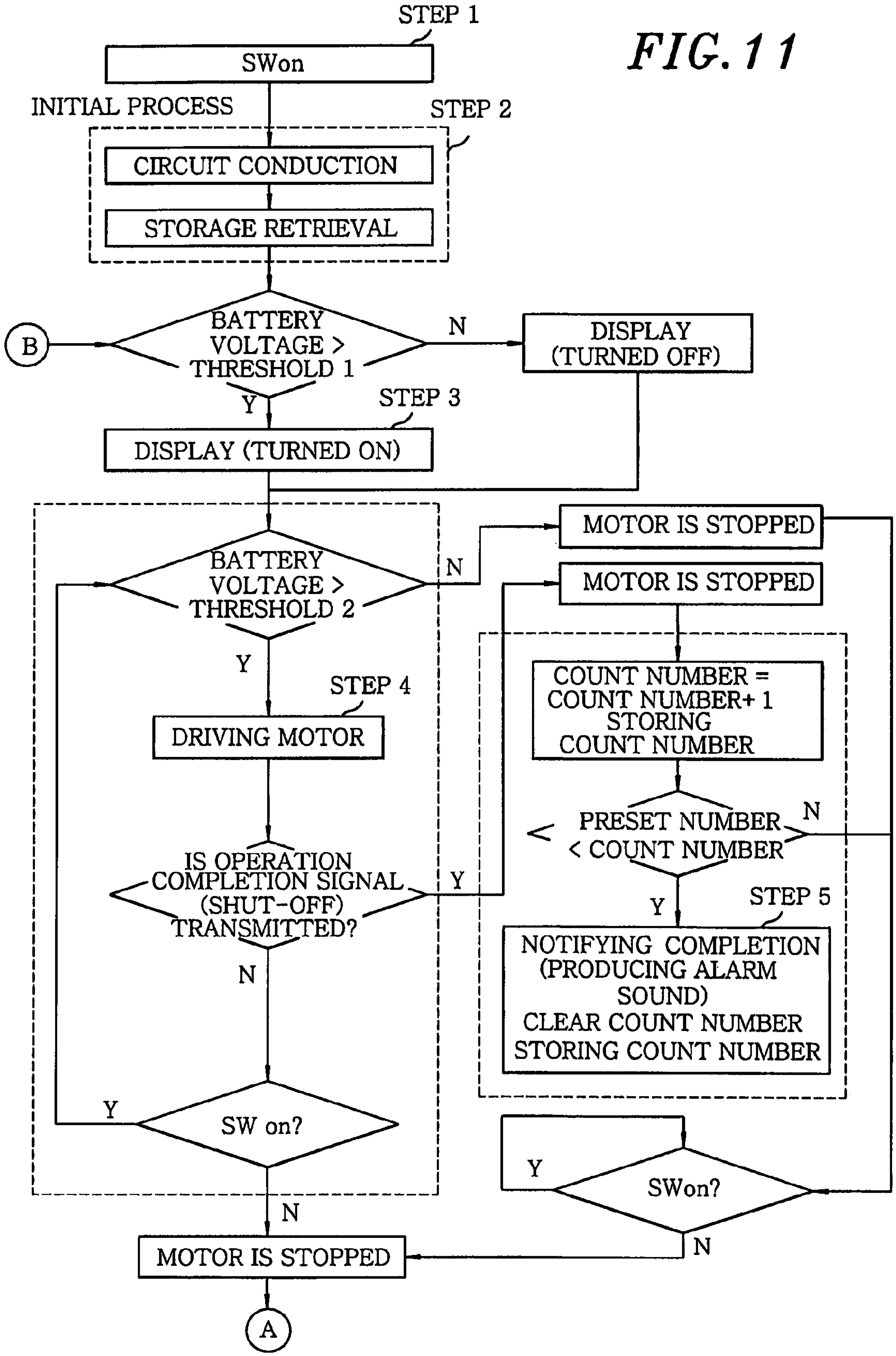
FIG. 11 shows a flow chart for explaining an exemplary operation of the control circuit.

Hereinafter, an exemplary operation of the control circuit 8 will be described with reference to the flow charts of FIGS. 11 and 12. As shown in FIG. 11, when the trigger switch SW is turned on (Step 1), an initial process (circuit conduction and storage retrieval) is performed (Step 2). Next, the display portion 18 is turned on (Step 3) only when a battery pack output voltage (referred to as "battery voltage" hereinafter) is determined to be higher than a first threshold. At this time, the display portion 18 displays thereon preset data (e.g., a preset number (initial value of count value) "10" in case of the count-down mode is selected). When the battery voltage is determined to be higher than a second threshold which is greater than the first threshold), the motor 11 is driven to perform the screw tightening operation (Step 4).

Thereafter, when a tightening torque becomes a specific value (i.e., when the clutch is driven), the shut-off signal (pulse signal) is transmitted from the photo-interrupter 4*a* to the CPU 21, and the CPU 21 automatically stops the motor 11. At this time, the number of tightening operations, i.e., "1" is counted by the screw tightening count unit 5, so that the number displayed on the display portion 18 is switched from "10 to "9" (if the count-up mode was selected, the number displayed on the display portion 18 is switched from "0" to "1"). When the number of tightening operations reaches the preset number eventually, the alarm sound is produced from the piezoelectric buzzer 7*a*, thereby notifying the operator of the completion of the tightening operations and preventing the operator from forgetting to tighten all the screws. When the number of tightening operations reaches the preset number, and the number displayed on the setting/display unit 6*a* automatically returns to the original number (e.g., "10") (Step 5), thereby completing the corresponding screw tightening operations.

Figure 12:
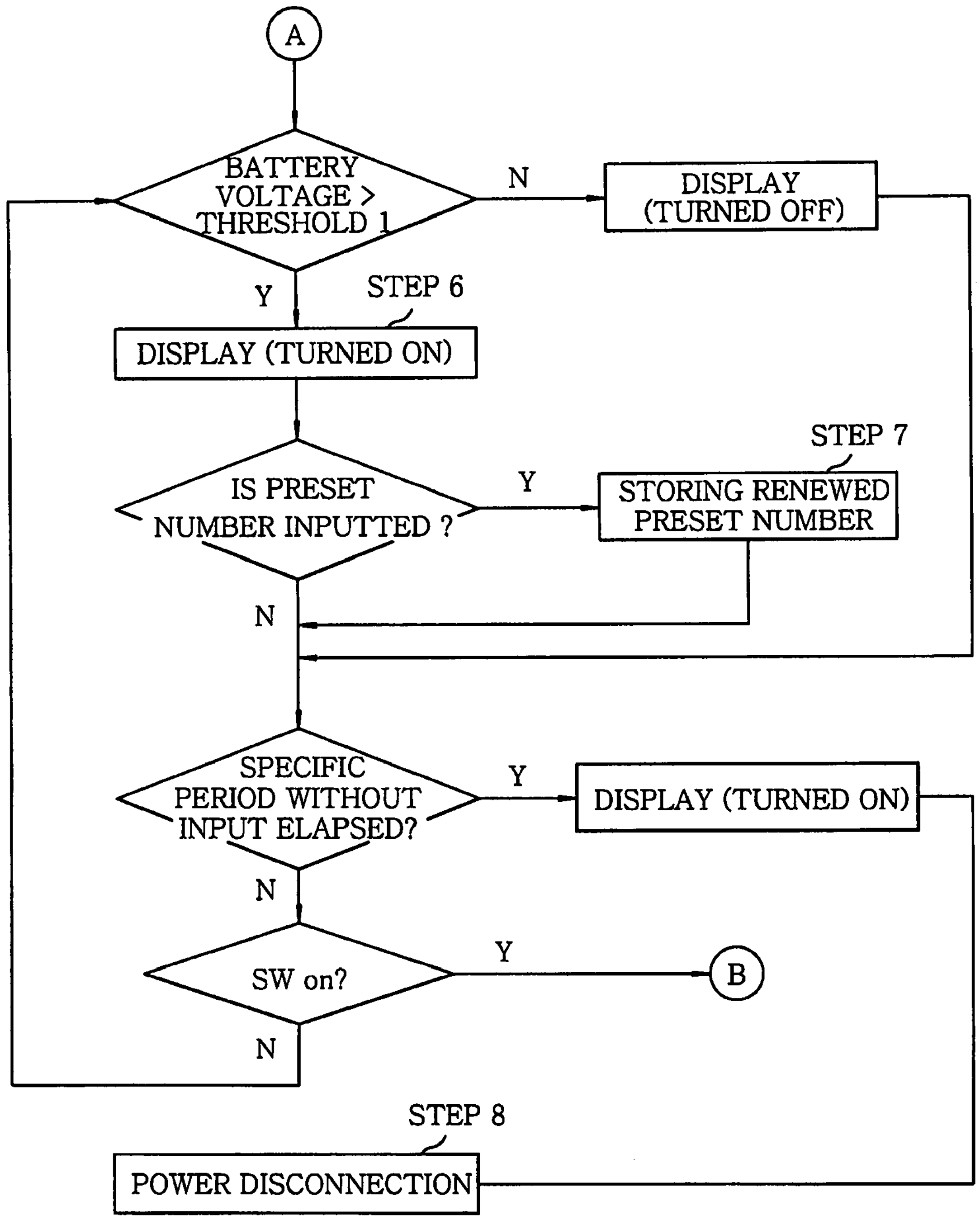
FIG. 12 illustrates a flow chart for explaining another exemplary operation of the control circuit.

In case where the setting data are renewed after the motor 11 is stopped, it is first determined whether or not the battery voltage is higher than the first threshold, as shown in FIG. 12. Only when the battery voltage is determined to be higher than the first threshold, the display portion 18 is turned on (Step 6). Next, when a new setting number is inputted, the newly inputted number is stored as a renewed number of tightening operations (Step 7). Meanwhile, if a specific period of time elapses without receiving a setting number, the power to the setting/display unit 6*a* is disconnected to turn off the display portion 18 (Step 8).

According to the above configuration, the power tool main body 2 is equipped with the function of monitoring the screw tightening operations, thereby preventing an operator from forgetting to tighten all the screws. Accordingly, it is possible to avoid a defective assembly of a product and reduce an operator's burden accompanied by the potential forgetfulness of the screw tightening operation, thereby improving the accuracy and the efficiency of the screw tightening operations. Moreover, unlike in the prior art, there is no need to connect the power tool and the controller via the power cord. Especially, by providing the function of monitoring a screw tightening operation to the cordless rechargeable power tool having the attachable/detachable battery pack 9 of this example, the working area is no longer restricted. Consequently, the advantages of the cordless type can be fully utilized.

Further, by disposing the screw tightening number setting unit 6 and the screw tightening completion notifying unit 7 at the lower front portion 12*a* of the grip portion 12, the body portion 13 or the grip portion 12 of the housing 3 need not to be enlarged and, also, gripping of the grip portion 12 is not hindered. Further, the grip portion 12 is not subject to great impacts or vibrations, compared to the heavy body portion 13 having therein the motor 11, when the power tool 1 is dropped during its use. Therefore, it is possible to effectively prevent damages from being inflicted on the components of the screw tightening number setting unit 6 and the screw tightening completion notifying unit 7.

Moreover, the power from the battery pack 9 to the setting/display unit 6*a* is disconnected after a specific period of time elapses after the completion of the screw tightening operations. Therefore, the waste of the battery in the battery pack 9 can be avoided. Also, when a measured battery voltage is lower than or equal to a specific value (first threshold), the power to the setting/display unit 6*a* is disconnected. Further, when a measured battery voltage is lower than or equal to the second threshold greater than the first threshold, the power to the motor 11 is stopped. Accordingly, power can be saved and, further, the burden on the battery pack 9 can be reduced.

In this embodiment, the setting/display unit 6*a* of the control circuit 8 is provided with a hold switch 10 for preventing a data change on the display portion 18, as shown in FIG. 10. A manipulation portion of the hold switch 10 is provided on a side surface near the setting/display unit 6*a* disposed at the lower front portion 12*a* of the grip portion 12 (see FIG. 1). When the hold switch 10 is in a conducting state (ON), input to the setting/display unit 6*a* is allowed, whereas when the hold switch 10 is in a non-conducting state (OFF), input to the setting/display unit 6*a* is not allowed. By keeping the hold switch 10 to be ON, input to the setting/display unit 6*a* is possible. Further, by keeping the hold switch 10 to be OFF, the number of tightening operations will not change even if the setting/display unit 6*a* is touched accidentally during the operation. In other words, while the hold switch 10 is OFF, the change of numerals is disallowed even when the buttons of the display portion 18 are pressed. In the case where the setting/display unit 6*a* is disposed at the power tool main body 2, the number of tightening operations may be changed by accidentally touching the buttons of the setting/display unit 6*a* during the operation. However, the setting change during the operation can be prevented by activating the hold function of the embodiment of the present invention. As a result, the number of tightening operations can be precisely managed while maintaining the setting state.

There can be provided, instead of the hold switch 10, a configuration that disallows an input of setting data during an operation of the motor 11. For example, a circuit can be configured to cancel manipulation signals from the setting/display unit 6*a* when a signal for turning the motor 11 ON is inputted. Accordingly, even when the buttons of the setting/display unit 6*a* are accidentally pressed during the operation, the setting data or the count number will not change, as in the case of activating the hold switch 10.

The CPU 21 in the present embodiment has a storage (not shown) for storing therein the count number or the setting data of the setting/display unit 6*a*. As a result, it is possible to keep a preset number of tightening operations or a last count number in the storage unit when the battery is exchanged during the screw tightening operations. Therefore, the screw tightening operations can be continued after changing the battery.

In the present embodiment, the display of the number of tightening operations on the setting/display unit 6*a* provided at the lower front portion 12*a* of the grip portion 12 can be displayed upside down to accommodate the angle change between the straight shape and the "L" shape of the power tool 1. Accordingly, when an operator use the power tool 1 by holding the grip portion 12 heading either upward or downward, it is easy for the operator to read data on the setting/display unit 6*a* and perform a smooth screw tightening operations. Displaying characters or symbols upside down can be done by, e.g., pressing together the "+" button 19*b* and the "−" button 19*c*. By doing so, an embedded changeover switch is switched over, and a display control circuit allows the characters or the symbols to be displayed on the display portion upside down.

Figure 6:
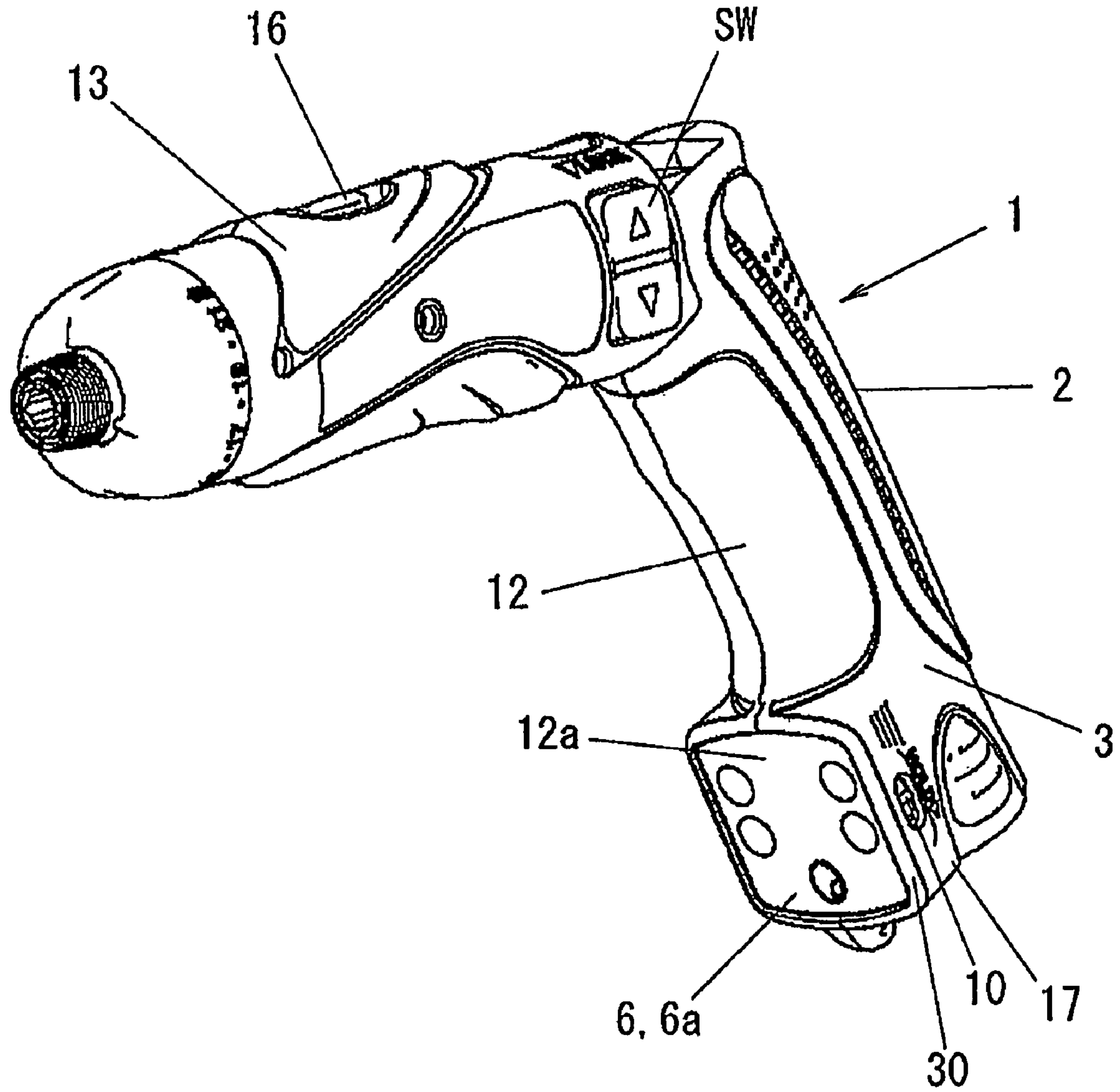
FIG. 6 represents a perspective view of a power tool in accordance with another embodiment of the present invention, wherein a protruded elastomer is installed around an outer periphery of a lower front portion of a grip portion of the power tool.

FIG. 6 shows another embodiment of the present invention which describes an example where a protruded elastomer 30 is installed around an outer periphery of the lower front portion 12*a* of the grip portion 12. Elastomer 30 is designed to absorb the impacts when the power tool main body 2 is dropped during its use. Accordingly, the grip portion 12 is protected from large impacts or vibrations and, it is also possible to prevent the breakage of the screw tightening number setting unit 6 and its components (the setting/display unit 6*a*, the piezoelectric buzzer 7*a* and the control circuit 8). As set forth above, the durability of the power tool 1 can be further enhanced with the addition of an elastomer 30 so that the power tool 1 can be used under severe conditions. As a result, the power tool of the present invention can be adaptively used in various product manufacturing processes or construction sites. Further, the elastomer 30 can be simply provided to the housing by 2-color injection molding of the elastomer resin and molding resin of the housing.

The power tool of the present invention can be applied both to a cord type power tool and a rechargeable type power tool.

While the invention has been shown and described with respect to the embodiments, it will be understood by those skilled in the art that various changes and modification may be made without departing from the scope of the invention as defined in the following claims.

What is claimed is:

1. A power tool comprising:

a driving unit for performing screw tightening operations;

a motor for rotatably driving the driving unit;

a rechargeable battery pack;

a trigger switch for turning on and off the motor; and a control circuit, accommodated in a main body of the power tool, for monitoring the screw tightening operations, wherein the control circuit has a screw tightening completion detection unit for detecting completion of a screw tightening operation; a screw tightening count unit for counting the number of completed screw tightening operations detected by the screw tightening completion detection unit; a screw tightening number setting unit for presetting the number of screws to be tightened; and a screw tightening completion notifying unit having a piezoelectric buzzer for notifying completion of the screw tightening operations when the number of completed screw tightening operations reaches the preset number of screws, and wherein the screw tightening number setting unit and the screw tightening completion notifying unit are disposed at a lower front portion of a grip portion in the main body of the power tool, for being held by a hand, wherein the piezoelectric buzzer produces one of selectable alarm sounds having different pitches.

2. The power tool of claim 1, wherein a protruded elastomer is installed around an outer periphery of the lower front portion of the grip portion.

3. The power tool of claim 1, wherein the screw tightening number setting unit includes a "mode" button, a "+" button and a "–" button, and a sound setting mode is initiated by setting the "mode" button longer than a predetermined time.

4. The power tool of claim 1, wherein the screw tightening number setting unit is provided with a hold function to prevent the preset number of screws to be fastened from being changed.

5. The power tool of claim 1, wherein a body portion and the grip portion of the main body of the power tool are connected rotatably such that an angle therebetween is changed freely and the display of the number of tightening operations set by the screw tightening number setting unit provided at the lower front portion of the grip portion is displayed upside down.

6. The power tool of claim 3, wherein the predetermined time is 2 seconds.

7. The power tool of claim 3, wherein the pitches of the alarm sounds are changeable by pressing the "+" button or the "–" button in the sound setting mode and if the "mode" button is pressed while one of the alarm sounds having a specific pitch is produced, the alarm sound having that pitch is selected and stored.

* * * * *